(12) United States Patent
Friend et al.

(10) Patent No.: US 7,619,527 B2
(45) Date of Patent: Nov. 17, 2009

(54) INTEGRATED DATA READER AND ELECTRONIC ARTICLE SURVEILLANCE (EAS) SYSTEM

(75) Inventors: Matthew J. Friend, Boynton Beach, FL (US); Douglas A. Drew, Boca Raton, FL (US); David J. Newman, Springfield, OR (US); Gerardo Aguirre, Pompano Beach, FL (US); Ronald B. Easter, Parkland, FL (US); Garrett J. Barnum, Eugene, OR (US)

(73) Assignees: Datalogic Scanning, Inc., Eugene, OR (US); Sensormatic Electronics Corporation, Boca Raton, FL (US)

( * ) Notice: Subject to any disclaimer, the term of this patent is extended or adjusted under 35 U.S.C. 154(b) by 242 days.

(21) Appl. No.: 11/351,310

(22) Filed: Feb. 8, 2006

(65) Prior Publication Data

US 2006/0208894 A1    Sep. 21, 2006

Related U.S. Application Data

(60) Provisional application No. 60/651,058, filed on Feb. 8, 2005.

(51) Int. Cl.
    *G08B 13/14* (2006.01)
(52) U.S. Cl. .................. 340/572.3; 235/435; 235/473
(58) Field of Classification Search ... 340/572.1–572.9; 235/435–473
    See application file for complete search history.

(56) References Cited

U.S. PATENT DOCUMENTS

| | | | |
|---|---|---|---|
| 4,141,078 A | 2/1979 | Bridges, Jr. et al. | 364/900 |
| 4,575,624 A | 3/1986 | Klinkhardt | 235/449 |
| 4,652,863 A | 3/1987 | Hultman | 340/551 |
| 4,728,938 A | 3/1988 | Kaltner | 340/572 |
| 4,745,401 A | 5/1988 | Montean | 340/572 |
| 4,752,758 A | 6/1988 | Heltemes | 335/284 |
| 4,960,651 A | 10/1990 | Pettigrew et al. | 428/607 |
| 4,964,053 A | 10/1990 | Humble | 705/416 |
| 5,059,951 A | 10/1991 | Kaltner | 340/572 |
| 5,103,235 A | 4/1992 | Clemens | 343/742 |
| 5,139,100 A | 8/1992 | Brauneis | 177/25.15 |
| 5,142,292 A | 8/1992 | Chang | 343/742 |
| 5,210,524 A | 5/1993 | Schwarz et al. | 340/551 |
| 5,225,807 A | 7/1993 | Zhou et al. | 340/551 |
| 5,341,125 A | 8/1994 | Plonsky et al. | 340/572 |
| 5,376,923 A | 12/1994 | Kindschy | 340/572 |

(Continued)

FOREIGN PATENT DOCUMENTS

DE    199008880    9/2000

(Continued)

OTHER PUBLICATIONS

U.S. Appl. No. 11/699,207, Clifford et al., filed Jan. 25, 2007 (Continuation of US 7,170,414 cited above).

(Continued)

*Primary Examiner*—Davetta W Goins
*Assistant Examiner*—Edny Labbees
(74) *Attorney, Agent, or Firm*—Stoel Rives LLP

(57) ABSTRACT

An integrated data reader and electronic article surveillance (EAS) system, and methods of operation. Several configurations are also disclosed for alternate deactivation coil designs and mounting schemes.

17 Claims, 17 Drawing Sheets

U.S. PATENT DOCUMENTS

| | | | |
|---|---|---|---|
| 5,377,269 A | 12/1994 | Heptig et al. | 380/25 |
| 5,410,108 A | 4/1995 | Williams et al. | 177/25.15 |
| 5,587,703 A | 12/1996 | Dumont | 340/572 |
| 5,588,621 A | 12/1996 | Collins et al. | 248/27.1 |
| 5,635,906 A | 6/1997 | Joseph | 340/572 |
| 5,747,744 A | 5/1998 | Kraft et al. | 177/25.15 |
| 5,837,988 A | 11/1998 | Bobba et al. | 235/467 |
| 5,841,348 A | 11/1998 | Herzer | 340/551 |
| 5,886,336 A | 3/1999 | Tang et al. | 235/462.43 |
| 5,917,412 A | 6/1999 | Martin | 340/572.3 |
| 5,939,984 A | 8/1999 | Brady et al. | 340/572.1 |
| 5,955,951 A | 9/1999 | Wischerop et al. | 340/572.8 |
| 5,963,134 A | 10/1999 | Bowers et al. | 340/572.1 |
| 5,978,772 A | 11/1999 | Mold | 705/16 |
| 5,984,182 A | 11/1999 | Murrah et al. | 235/383 |
| 5,990,794 A | 11/1999 | Alicot et al. | 340/573.1 |
| 6,011,474 A * | 1/2000 | Coffey et al. | 340/572.3 |
| 6,025,780 A | 2/2000 | Bowers et al. | 340/572.3 |
| 6,102,290 A | 8/2000 | Swartz et al. | 235/462.01 |
| 6,114,961 A | 9/2000 | Denholm et al. | 340/572.3 |
| 6,121,878 A | 9/2000 | Brady et al. | 340/572.1 |
| 6,154,135 A | 11/2000 | Kane et al. | 340/572 |
| 6,154,137 A | 11/2000 | Goff et al. | 340/572.4 |
| 6,169,483 B1 * | 1/2001 | Ghaffari et al. | 340/572.3 |
| 6,206,285 B1 | 3/2001 | Baitz et al. | 235/380 |
| 6,208,235 B1 | 3/2001 | Trontelj | 340/10.1 |
| 6,234,394 B1 | 5/2001 | Kahn et al. | 235/462.46 |
| 6,237,852 B1 | 5/2001 | Svetal et al. | 235/462.43 |
| 6,252,508 B1 | 6/2001 | Vega et al. | 340/572.1 |
| 6,281,796 B1 | 8/2001 | Canipe et al. | 340/572.3 |
| 6,299,702 B1 | 10/2001 | Herzer | 148/108 |
| 6,333,692 B1 | 12/2001 | Anderson et al. | 340/572.1 |
| 6,335,686 B1 | 1/2002 | Goff et al. | 340/572.4 |
| 6,346,884 B1 | 2/2002 | Uozumi et al. | 340/572.1 |
| 6,356,197 B1 | 3/2002 | Patterson et al. | 340/572.1 |
| 6,429,776 B1 | 8/2002 | Alicot et al. | 340/572.1 |
| 6,486,780 B1 | 11/2002 | Garber | |
| 6,497,361 B1 | 12/2002 | Mason | 235/383 |
| 6,499,656 B1 | 12/2002 | Marsh et al. | 235/375 |
| 6,507,279 B2 | 1/2003 | Loof | 340/572.1 |
| 6,517,000 B1 | 2/2003 | McAllister et al. | 235/462.01 |
| 6,592,037 B1 | 7/2003 | Clancy | 235/462.13 |
| 6,595,421 B2 | 7/2003 | Detwiler | 235/462.14 |
| 6,598,791 B2 | 7/2003 | Bellis | |
| 6,764,010 B2 | 7/2004 | Collins, Jr. et al. | 235/462.11 |
| 6,778,087 B2 * | 8/2004 | Belka et al. | 340/572.3 |
| 6,783,072 B2 | 8/2004 | Acosta et al. | 235/462.12 |
| 6,788,205 B1 | 9/2004 | Mason et al. | 340/572.3 |
| 6,809,645 B1 | 10/2004 | Mason | 340/572.1 |
| 6,854,647 B2 | 2/2005 | Collins, Jr. et al. | 235/383 |
| 6,857,567 B2 | 2/2005 | Latimer | |
| 7,019,651 B2 * | 3/2006 | Hall et al. | 340/572.7 |
| 7,066,172 B2 * | 6/2006 | Pasternack | 128/202.22 |
| 7,068,172 B2 * | 6/2006 | Yang et al. | 340/572.3 |
| 7,132,947 B2 * | 11/2006 | Clifford et al. | 340/572.3 |
| 7,170,414 B2 | 1/2007 | Clifford | 340/572.3 |
| 7,172,123 B2 | 2/2007 | Acosta et al. | 235/462.13 |
| 7,242,304 B2 * | 7/2007 | Clancy et al. | 340/572.9 |
| 2002/0011933 A1 | 1/2002 | Andersen et al. | 340/572.1 |
| 2002/0123932 A1 | 9/2002 | Brenhouse | 705/16 |
| 2003/0075602 A1 | 4/2003 | Wike, Jr. et al. | 235/383 |
| 2003/0135417 A1 | 7/2003 | Bodin | 705/16 |
| 2003/0146278 A1 | 8/2003 | Collins, Jr. et al. | 235/383 |
| 2003/0146280 A1 * | 8/2003 | Acosta et al. | 235/454 |
| 2003/0197611 A1 | 10/2003 | Clifford et al. | 340/572.1 |
| 2003/0209600 A1 | 11/2003 | Collins, Jr. et al. | 235/383 |
| 2004/0000591 A1 | 1/2004 | Collins, Jr. et al. | 235/462.14 |
| 2004/0113791 A1 | 6/2004 | Salim et al. | 340/572.3 |
| 2004/0189472 A1 | 9/2004 | Acosta et al. | 235/462.13 |
| 2005/0145694 A1 | 7/2005 | Collins | 235/383 |
| 2007/0063045 A1 | 3/2007 | Acosta et al. | 235/462.01 |

FOREIGN PATENT DOCUMENTS

| | | |
|---|---|---|
| EP | 0 329 402 B1 | 12/1994 |
| EP | 1 098 276 A2 | 5/2001 |
| EP | 1 335 336 A2 | 8/2003 |
| WO | WO 85/02285 | 5/1985 |
| WO | WO 00/26880 | 5/2000 |
| WO | WO 00/67193 | 11/2000 |

OTHER PUBLICATIONS

Brochure: Mettler Toledo 8217AS Adaptive Scale (1996).

Brochure: Magellan SL™ 350-Degree Scanner/Scale, PSC Inc. (Feb. 2000).

Brochure: Sensormatic ScanMax™/SlimPad™ Electronic Article Surveillance Deactivator, Sensormatic Electronics Corporation (Jul. 1999).

Brochure: Sensormatic SlimPad™ Pro Ultra-Max™ Label Deactivator, Sensormatic Electronics Corporation (2002) Downloaded from http://www.sensormatic.com/EAS/deactivation/slimpad.asp, visited Jul. 29, 2003.

Brochure: Sensormatic ScanMax™ HS Pro Ultra-Max® Scanner-Embedded Label Deactivator, Sensormatic Electronics Corporation (2002) http://www.sensormatic.com/EAS/deactivation/slimpad.asp, visited Jul. 29, 2003.

Brochure: Mettler Toledo 8217AS Scanner Scale (2003) from http://www.mt.com/mt/product_detail/product.jsp?m=t&key=Y3MDg4NjM1Mj visited Aug. 28, 2003.

Installation Guide for Sensormatic Acousto-Link™ Option for Ultra-Max Deactivators, Sensormatic Electronics Corporation (2000).

Sensormatic 2001 Product Catalog, pp. 117-119, 139-145, Sensormatic Electronics Corporation (Jun. 2001).

Transponder News, Aug. 14, 2003, http://www.rapidttp.com/transponder/index.html, visited Aug. 20, 2003.

Spectra-Physics VS1000 and VS1200 Scanner Level I Service Manual, pp. 4-31 through 4-32 (Dec. 1994).

PSC Scanning, Inc. Magellan SL Scanner and Scanner/Scale Installation and Operation Manual, pp. 1-3 through 1-6 and 2-23 through 2-26 (2001).

Photographs of NCR 7880 Scanner-scale; manufacture date listed Sep. 1996.

NCR 7880 Scanner-scale User's Guide © 1997 (note: p. 1-16 "Checkpoint" interface; p. 1-18 "Checkpoint Upgrade"; p. 3-7, 3-8 and 3-16 model designation for Checkpoint and installation instruction).

Brochure: Checkpoint Systems, Inc.; RF-based deactivation systems integrated into scanners and scanner-scales, brochure # TFS-007 © 1998 (two pages).

NCR 7875 Scanner/Scale Checkpoint for Kit 7875-K203-V001 (Document # 497-0407861) indicated release date Jan. 21, 1997; (p. 5, 8, 9).

Latimer, et al., U.S. Appl. No. 11/970,446: Notice of Allowance (10 pages).

* cited by examiner

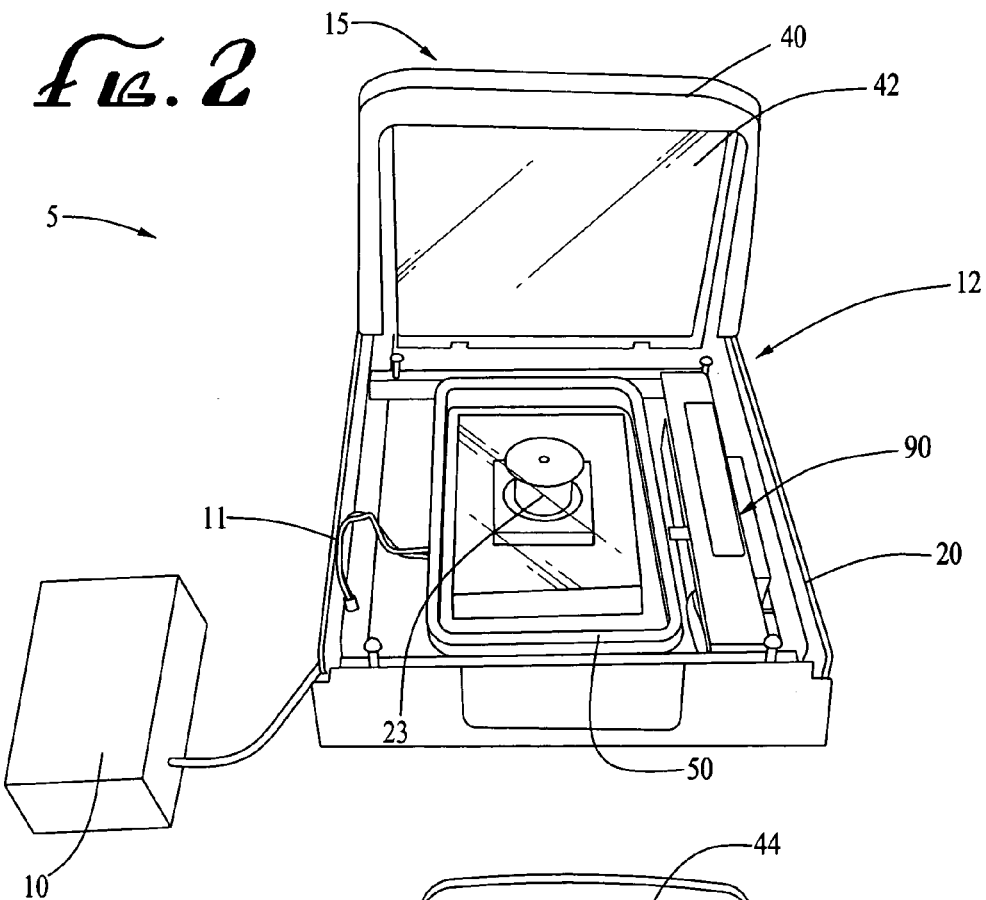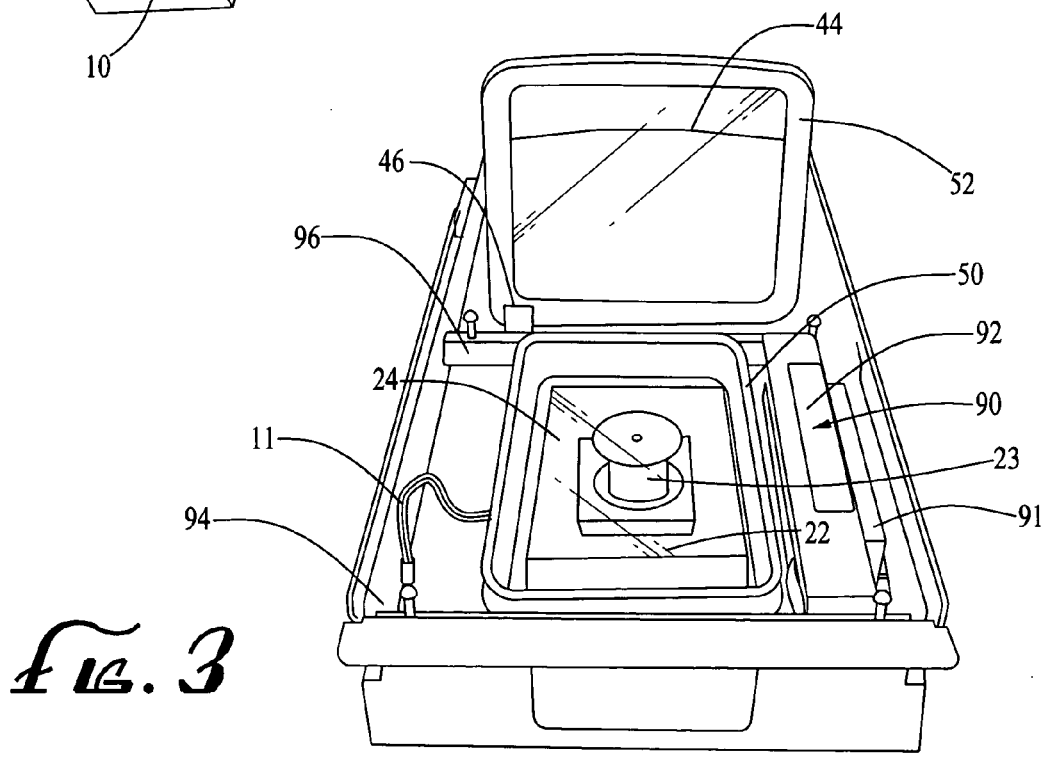

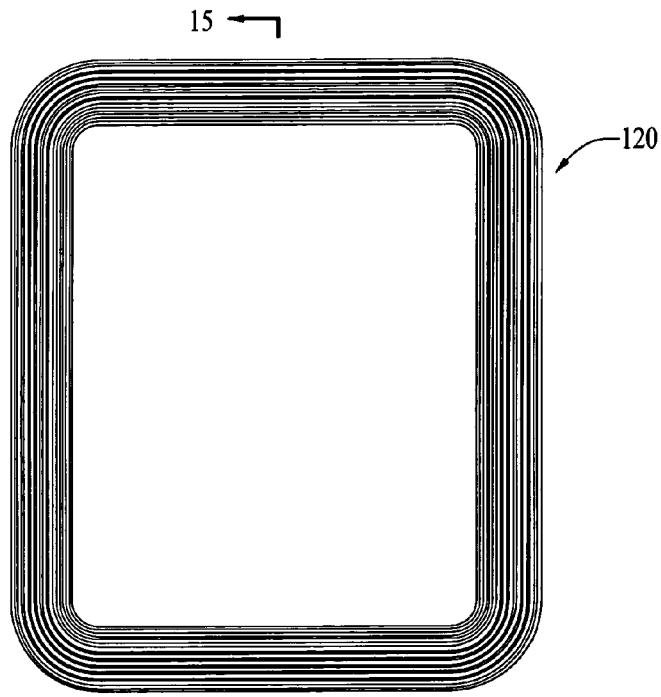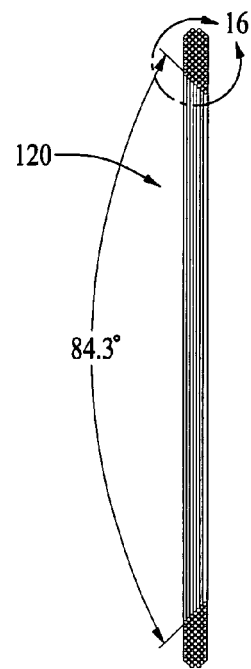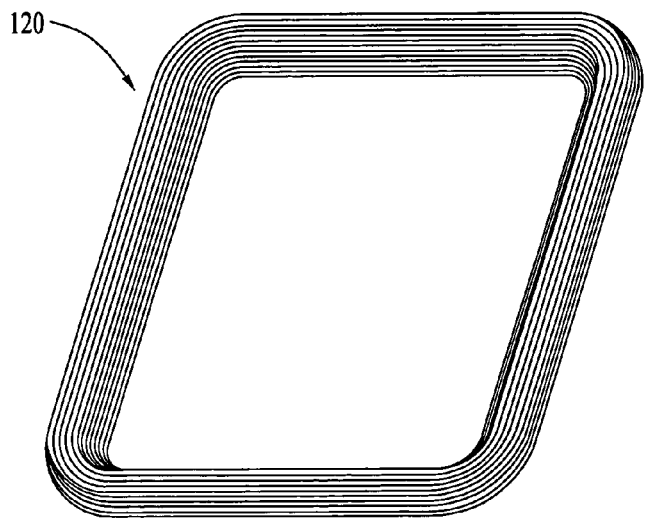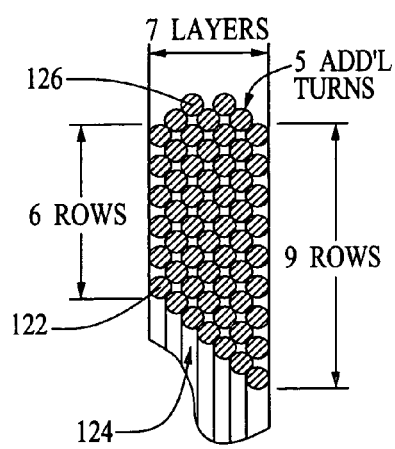

250

250

INTEGRATED DATA READER AND ELECTRONIC ARTICLE SURVEILLANCE (EAS) SYSTEM

RELATED APPLICATION DATA

This application claims priority to provisional application Ser. No. 60/651,058 filed Feb. 8, 2005, hereby incorporated by reference.

BACKGROUND

The field of the present invention relates to data reading systems and electronic article security (EAS) systems. In particular, various systems and methods are described herein for integrating an EAS system into a data reading system such as a barcode scanner.

In both retail checkout and inventory control environments, items are typically provided with readable tags or labels such as bar codes or RFID tags. Data reading devices such as barcode scanners and RFID readers are provided at the checkout station to read the codes or tags and obtain the data contained therein. The data may be used to identify the article, its price, and other characteristics or information related to checkout or inventory control. These data readers automate the information retrieval to facilitate and speed the checkout process. Thus data readers such as bar code scanners are pervasive at retail checkout.

Scanners generally come in three types: (a) handheld, such as the PowerScan™ scanner, (b) fixed and installed in the countertop such as the Magellan® scanner, or (c) a hybrid scanner such as the Duet® scanner usable in either a handheld or fixed mode. Each of these scanners is manufactured by PSC Inc. of Eugene, Oreg. In a typical operation, retail clerk uses either a handheld scanner to read the barcode symbols on the articles one at a time or passes the articles through the scan field of the fixed scanner one at a time. The clerk then places the articles into a shopping bag or other suitable container.

Though barcodes provide for rapid and accurate item identification at checkout, the bar codes do not provide for item security against theft. Electronic article surveillance (EAS) systems have employed either reusable EAS tags or disposable EAS tags to monitor articles to prevent shoplifting and unauthorized removal of articles from store. Reusable EAS tags are normally removed from the articles before the customer exits the store. Disposable EAS tags are generally attached to the packaging by adhesives or are disposed inside item packaging. These tags remain with the articles and must be deactivated before they are removed from the store by the customer.

There are several types of deactivation systems including magnetic, radio frequency (RF), and microwave. These systems have different structural designs and different operational characteristic. By way of example, magnetic deactivation devices use coils which are energized to generate a magnetic field of sufficient magnitude to render the EAS tag inactive. In another example, an RF system uses a wire loop antenna to generate an RF signal whereby an RF-based security tag receives the signal and deactivates in response thereto.

In any of the EAS systems, once deactivated, the tags are no longer responsive to the detection systems, the detection system typically being located at the store exits, so that an alarm is not triggered.

Some retail establishments having high volumes find it desirable to expedite and facilitate the checkout process including the scanning of the bar code data and the deactivation of the EAS tags. In the typical point of sale (POS) location such as the checkout counter of a retail checkout station, counter space is limited. In one RF-based system, an EAS deactivation wire loop is disposed around the horizontal scan window of a two-window "L" shaped scanner such as the Magellan® scanner. In such a system, barcode scanning and EAS tag deactivation presumably are accomplished over the same scan volume. Another system is disclosed in U.S. Pat. No. 6,783,072 which discloses, among other things, various embodiments of a magnetic-based EAS deactivation system integrated into a two-window "L" shaped scanner.

SUMMARY

Various embodiments disclosed herein are directed to integrated data reader and EAS systems, methods of operation, deactivation coil designs, and arrangements and mounting schemes. In a preferred configuration, a data reader such as a barcode scanner is equipped with one or more EAS deactivation modules disposed behind the scanner surface and arranged to generate a deactivation field of a desired orientation to deactivate EAS tags on items as they are passed through the scan field defined by the scanner window(s) of the data reader.

Additional aspects and advantages of this invention will be apparent from the following detailed description of preferred embodiments, which proceeds with reference to the accompanying drawings.

BRIEF DESCRIPTION OF THE DRAWINGS

FIG. 2 is a top view of a combined data reader and EAS system according to a preferred embodiment, shown with the weigh platter removed.

FIG. 3 is a top view of the combined data reader and EAS system of FIG. 2 with the top bonnet removed.

FIG. 13 is an isometric view of an alternate coil unit.

FIG. 14 is a front plan view of the coil unit of FIG. 13.

FIG. 15 is a cross-sectional view of the coil unit of FIG. 14 taken along line 14-14.

FIG. 16 is a detailed view of the windings of the coil unit of FIG. 15.

DETAILED DESCRIPTION OF PREFERRED EMBODIMENTS

Figure 1:
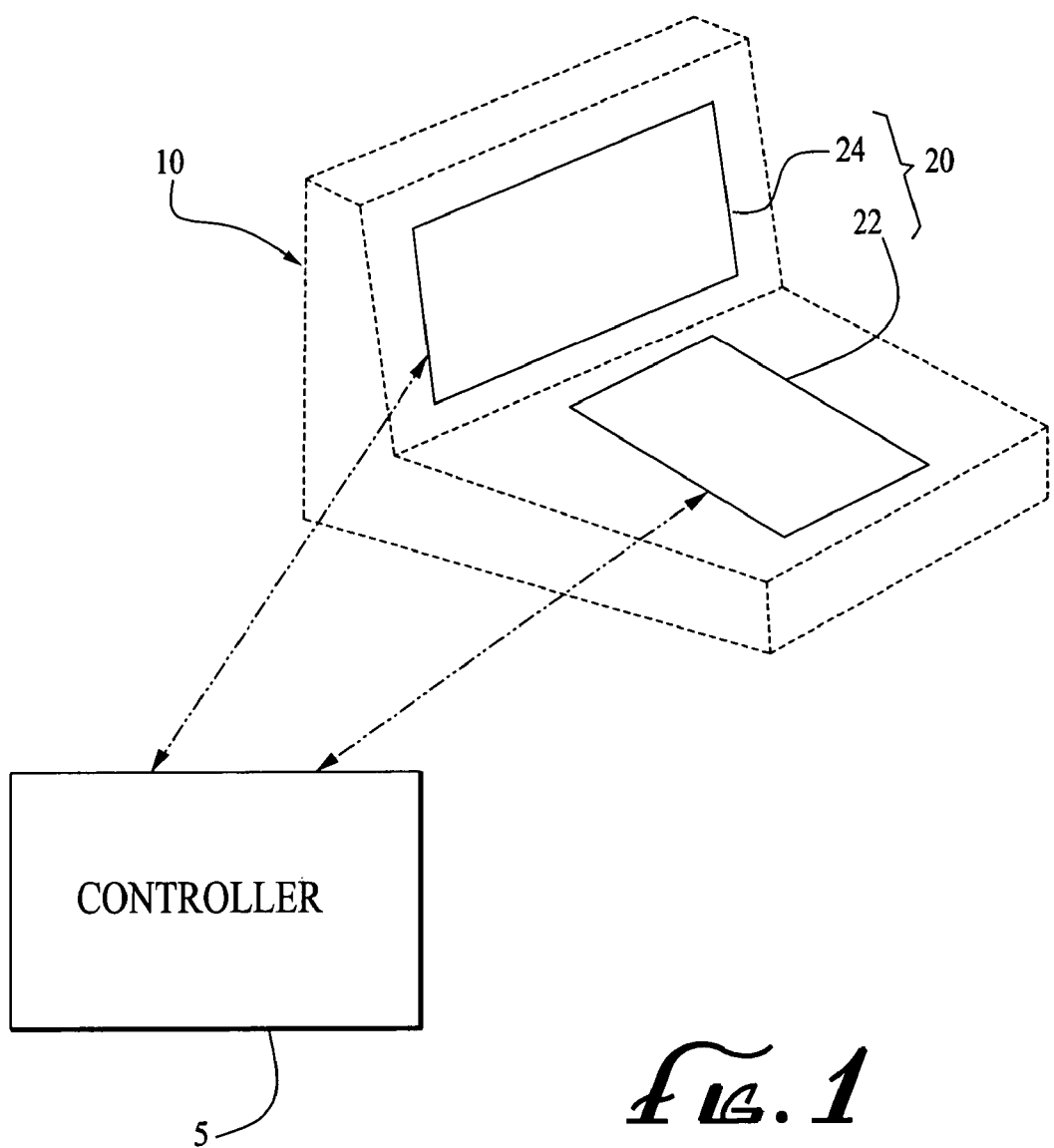
FIG. 1 is a schematic diagram of a combined data reader and EAS system according to a first embodiment.
Figure 4:
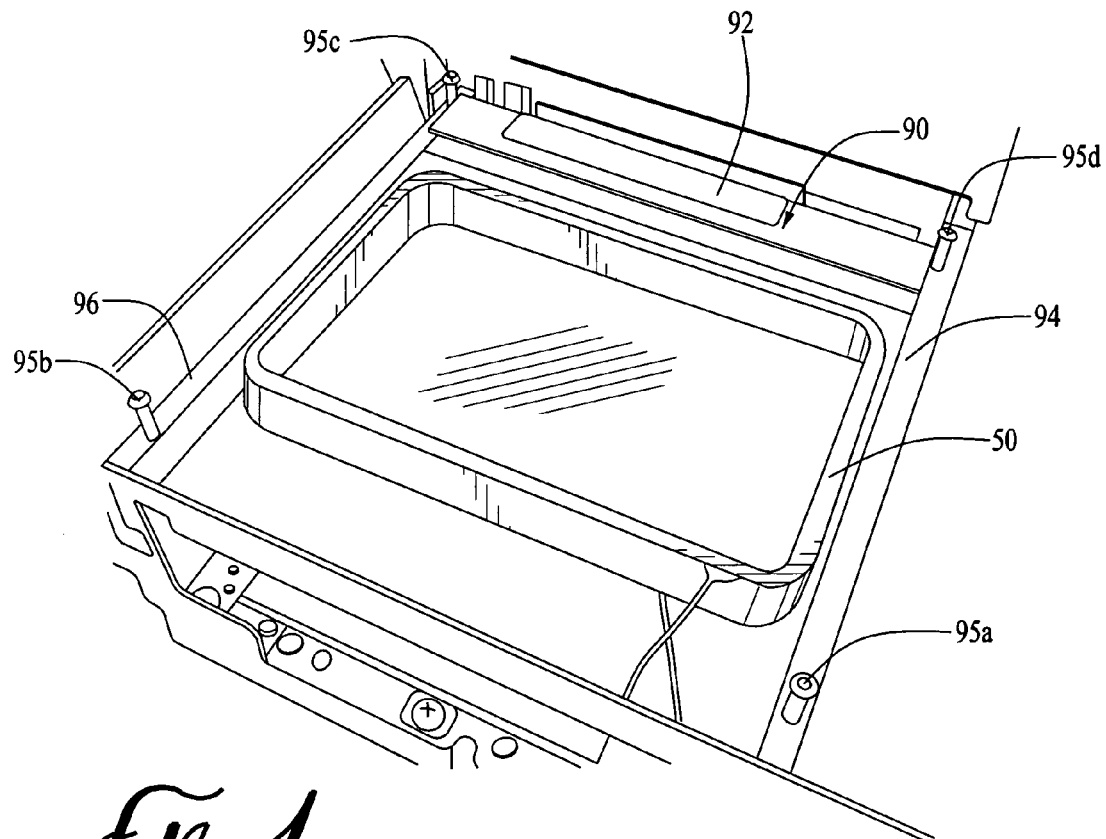
FIG. 4 is a top view of the combined data reader and EAS system of FIG. 2 illustrating placement and details of the horizontal coil unit.

Preferred embodiments of the present invention will now be described with reference to the drawings. To facilitate description, any reference numeral representing an element in one figure will represent the same element in any other figure.

FIG. 1 diagrammatically illustrates a system 5 comprised of an EAS controller 10 and a combined data reader and EAS deactivation system 15. The combined data reader and EAS system 15 includes a lower housing section 20 and an upper housing section 40. A horizontal EAS deactivation unit 50 is mounted within the lower housing section 20 and the upper or vertical EAS deactivation unit 52 is mounted within the upper housing section 40. Each of the deactivation coil units 50, 52 is connected to the controller 10 which either may be integrated into the data reader housing or may comprise a separated component connected via a cable.

FIGS. 2-8 illustrate details of such a system 5 according to a first preferred embodiment. System 5 includes an external controller 10 connected via a cable 11 to a combined EAS and data reader system 15. System 15 includes an outer housing or frame 12 with a lower housing section 20 containing a horizontal window 22 and an upper housing section 40 containing a vertical window 42.

The system 15 is illustrated with a scale system disposed within the lower housing section for supporting a weigh platter. The weigh platter is not shown in FIGS. 2-4 as it has been removed to allow internal components of the system 15 to be visible in the figures. The weigh platter may comprise a single plane, or may comprise multiple planes as described in U.S. Pat. No. 5,834,708 hereby incorporated by reference where the system comprises a scanner-scale having a two-plane or vertical plane scanner. Although the system 15 is illustrated as a two-plane scanner with a horizontal window 22 and a vertical window 42, the system may alternatively comprise a single window, either a single horizontal window (such a horizontal scanner) or a single vertical window (such as a vertical scanner).

The scanner itself may be of any suitable configuration. As viewed in the figure, the scanner includes a facet wheel 23 disposed in the lower housing section. The illustrated embodiment for the scanner may comprise a Magellan 9500 dual plane scanner available from PSC Inc. of Eugene, Oreg.

In embodiments where the scanner 15 includes a weigh scale, the lower magnetic coil unit 50 must not only not interfere with the scanner optics being passed out from the lower scan section 24 but must also be disposed so as not to interfere with the scale system. In this embodiment, the scale system includes a spider 90 of a U-shaped construction, with the central portion 92 disposed over a load cell 91, and a first lateral extension 94 disposed at a front or checker side of the weigh platter, and a second lateral extension 96 disposed at the rear of the weigh platter adjacent to the upper housing section 40. The weigh platter is suspended on top of the U-shaped spider 90 via positioners such as height adjustment bolts 95a, 95b, 95c, 95d.

FIG. 3 illustrates the system 15 with the bonnet of the upper housing section 40 removed exposing the upper coil 52. The upper coil 52 is mounted to the frame of the unit 15 via upper coil mounts 46, which support the upper coil unit 52 in a secure vertical orientation behind the vertical window 42. Similar to the lower coil unit 50, the upper coil unit 52 is configured so as to provide a large enough opening so as not to interfere with the scan pattern coming out of the upper scan section 44.

Figure 5:
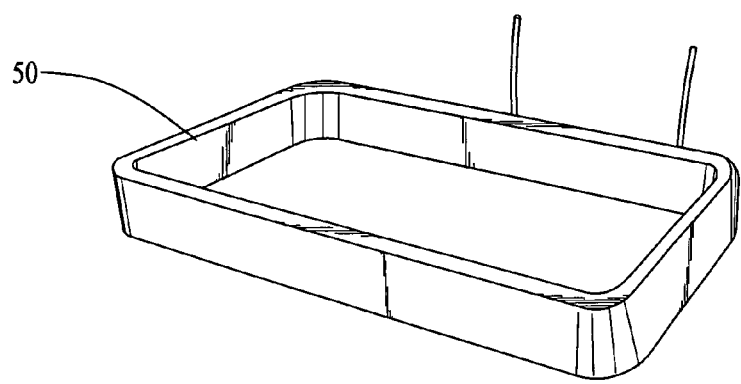
FIG. 5 is a perspective view of the horizontal coil unit from the combined data reader and EAS system of FIGS. 2-4 removed from the system.
Figure 6:
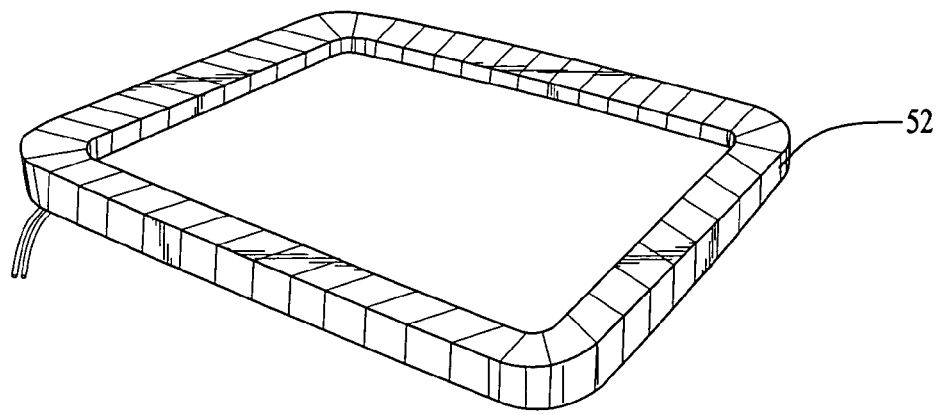
FIG. 6 is a perspective view of the vertical coil unit from the combined data reader and EAS system of FIGS. 2-4 removed from the system.
Figure 7:
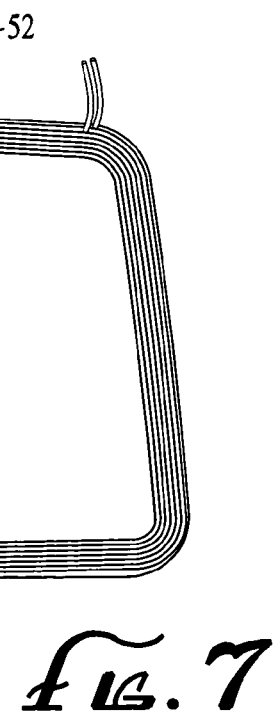
FIG. 7 is a perspective view of the vertical coil unit of FIG. 6 unwrapped with the internal coils exposed.
Figure 8:
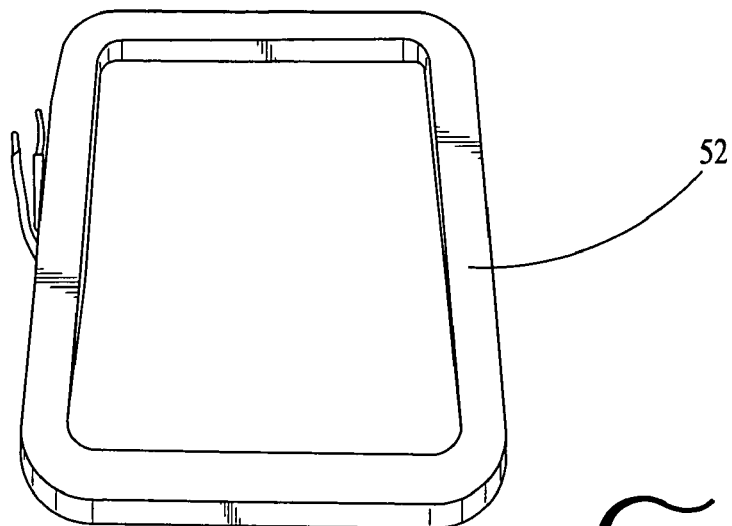
FIG. 8 is a perspective view of the vertical coil unit of FIGS. 6-7 with the wrapped coils coated.
Figure 10:
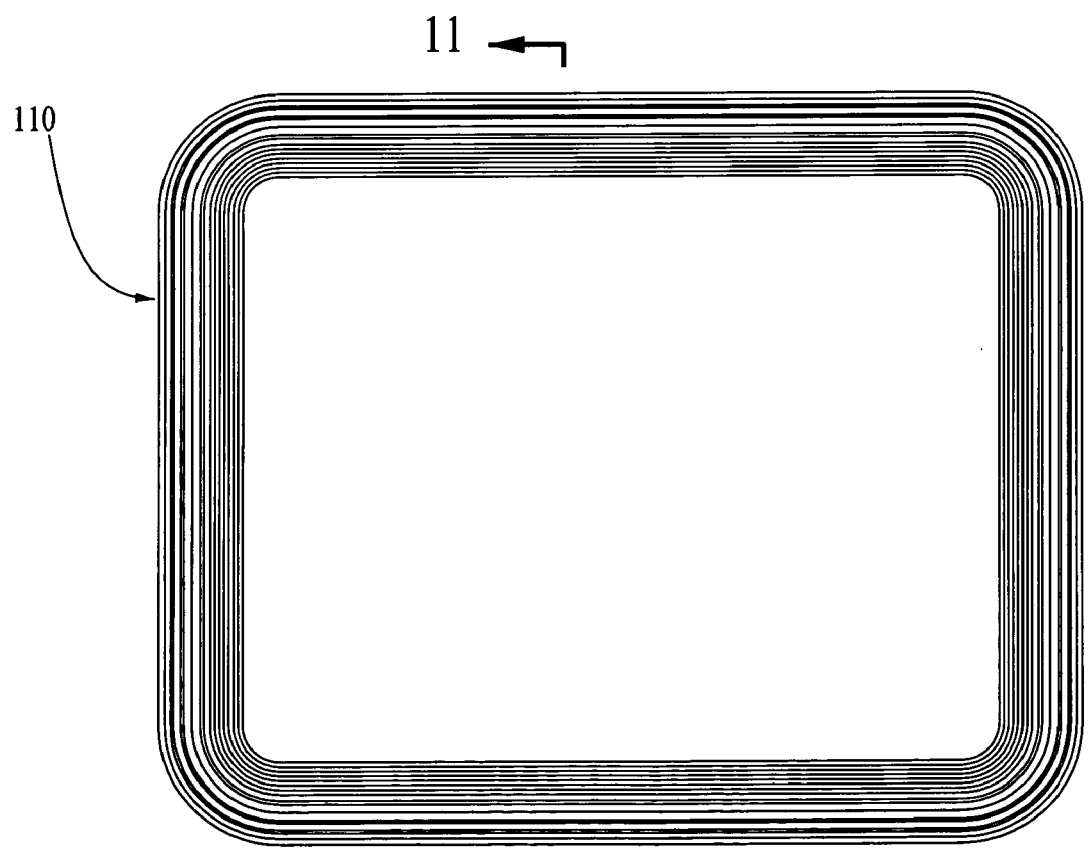
FIG. 10 is a front plan view of the coil unit of FIG. 9.
Figures 11, 12:
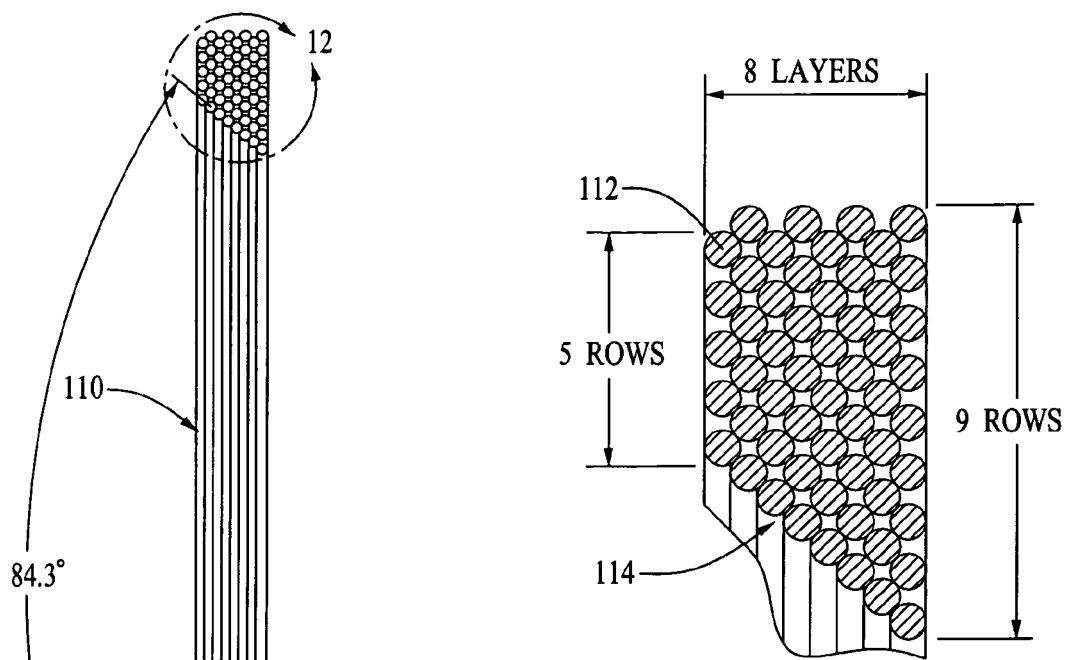
FIG. 11 is a cross-sectional view of the coil unit of FIG. 10 taken along line 11-11.
FIG. 12 is a detailed view of the windings of the coil unit of FIG. 11.
Figure 9:
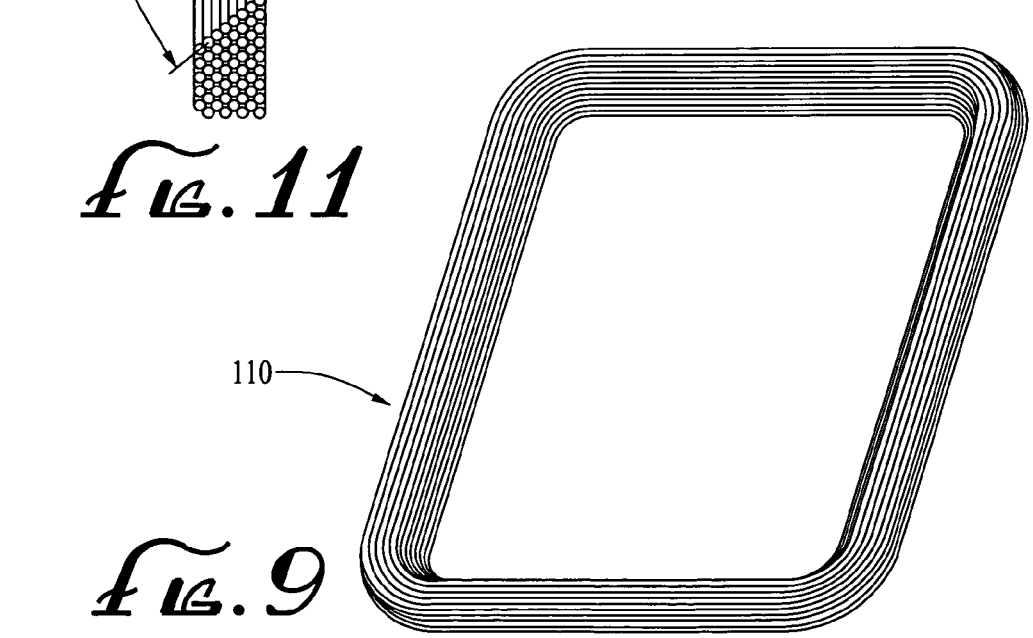
FIG. 9 is an isometric view of an alternate coil unit.
Figure 18:
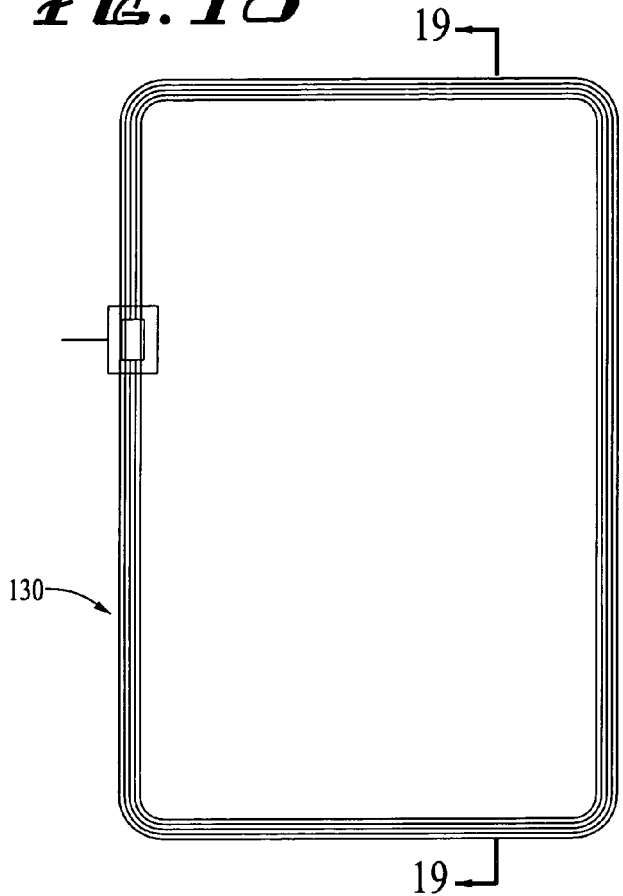
FIG. 18 is a front plan view of the coil unit of FIG. 17.
Figure 19:
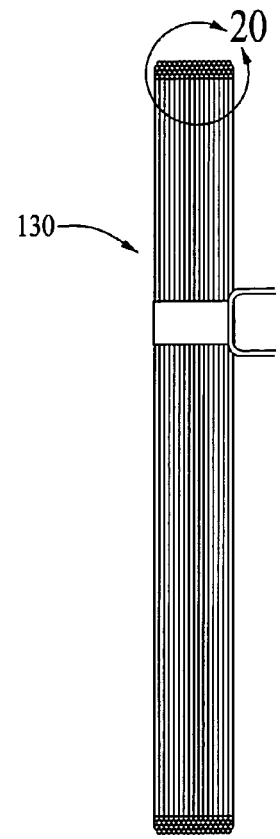
FIG. 19 is a cross-sectional view of the coil unit of FIG. 18 taken along line 19-19.
Figure 17:
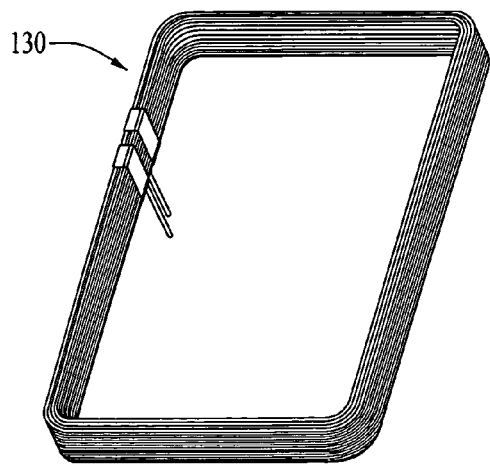
FIG. 17 is an isometric view of an alternate coil unit.
Figure 20:
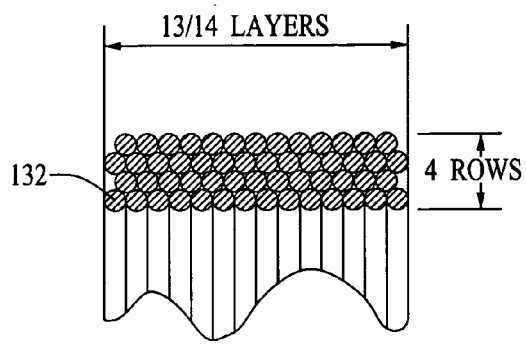
FIG. 20 is a detailed view of the windings of the coil unit of FIG. 19.

FIG. 5 illustrates a preferred configuration for the horizontal coil unit 50. FIGS. 6-7 illustrate preferred configuration for the upper coil unit 52. As viewed in the figures, each of the coil units 50, 52 is an air core magnetic coil assembly of a generally rectangular shape, the rectangular shape corresponding to the shape of the windows of the scanner. The coil units 50, 52 have been optimized to minimize the space required for the units and to minimize impact on scanner performance, that is to avoid interference with the scan pattern generation and the volume of the inner scan housings desired to generate the desired scan patterns. The shape is also designed to avoid interference with the scale systems previously described.

In a preferred configuration, the coil units 50, 52 are comprised of windings composed of a single wire of on the order of 50 turns as best shown in FIG. 7, which illustrates the vertical coil unit 52 with the internal coils exposed. The figure also illustrates the two ends of the single wire that forms the windings. In one configuration, the vertical coil unit 52 has 50 turns and the horizontal coil unit has 54 turns.

The controller 10 is connected to both the vertical coil unit 52 and the horizontal coil unit 50. The vertical coil unit 52 surrounds the vertical scanner window 42 and likewise the horizontal coil unit 50 surrounds the horizontal scanner window 22. In order to maximize space constraints for the scanner components and not interfere with scanner operation, the vertical coil unit 52 may be formed with a beveled profile to allow sufficient coil volume while not blocking the scan lines exiting through the vertical window 42 of the scanner. The horizontal coil unit 50 may also have a beveled profile so as to provide additional room for scan beams exiting the horizontal window 22.

The geometry of the coil units may best be explained when referring to a cross-section. The inner side of the coil unit is beveled or angled, thus creating a cross-sectional shape rather than rectangular to better approximate a trapezoid or triangle. Thus the outermost inner edge of the coil unit is recessed radially outward so as to better accommodate exiting scan beams passing through the central portion of the coil unit.

In operation, each of the coil units provides for both detection (transmitting the magnetic field to excite the labels and then receiving a return signal from the label) and deactivation (sending a deactivation pulse to deactivate the label). In a preferred control method, the controller 10 may detect which coil is best suited for deactivation and then only energize the appropriate coil. For example, if the vertical coil unit 52 is the one that detects (or best detects with the strongest return signal), then the controller 10 would determine that the vertical coil unit 42 is best suited for deactivation and then only energizes vertical coil unit 52 to deactivate the EAS tag.

In a preferred construction, the coil units are formed by winding the bare wire the appropriate number of turns (see for example FIG. 7) with the wound coils formed in the desired cross-sectional geometry. The coils may then be wrapped with a suitable insulated tape such as illustrated in FIGS. 5 and 6. In a preferred construction, the coil unit such as in FIG. 7 would be dip coated such as with a liquid form of polyvinyl chloride (PVC) generally known as plastisol such as the coil illustrated in FIG. 8.

FIGS. 9-12 illustrate an alternate embodiment for a coil unit which may be particularly suitable for the vertical plane but may also be useable in the horizontal plane. As showed by the details of the cross-section of FIGS. 11 and 12, the coils 112 are arranged with a trapezoidal cross-section formed with a bevel 114 on one side thereof. The windings or turns of the copper wire are arranged such that there are five rows on the outward side of the coil and nine rows of wire turns on the inward side of the coil. The beveled side 114 permits exit of scan lines out the window (the scan lines would be passing from right to left as viewed in FIGS. 11-12). In the particular winding configuration, the coil unit is formed with nine rows on the inside tapering down to five rows on the outside and with an eight-layer (four over four) width.

FIGS. 13-16 illustrate another alternative construction for a coil unit 120 useable in either a vertical or horizontal application. Coil unit 120 has approximately 56 complete turns and is shown in the detail of FIG. 16 and has the windings or turns 122 arranged with a beveled side 124 formed of a similar trapezoidal shape as in the previous embodiment with one side somewhat rounded by the addition of five additional turns 126. The coil unit 120 thus has nine rows on the upstream side and six rows on the downstream side and a seven-layer width (3/4 layers or three layers over four layers).

Although the non-rectangular, non-squared geometry of the coil units provides for certain benefits, rectangular units may provide sufficient geometric qualifications and tend to be more easily manufactured. FIGS. 17-20 illustrate another embodiment for a horizontal coil unit 130 (which may also be used as a vertical coil unit). Coil unit 130 has 54 windings or turns 132 arranged in 13/14 layers (13 layers over 14 layers) as shown in the detailed cross-section of FIG. 20. The coil unit 130 thus presents a fairly elongated rectangular shape in cross-section as viewed in FIG. 20 including about 54 complete turns arranged in four rows by 13/14 layers.

Figures 22, 23:
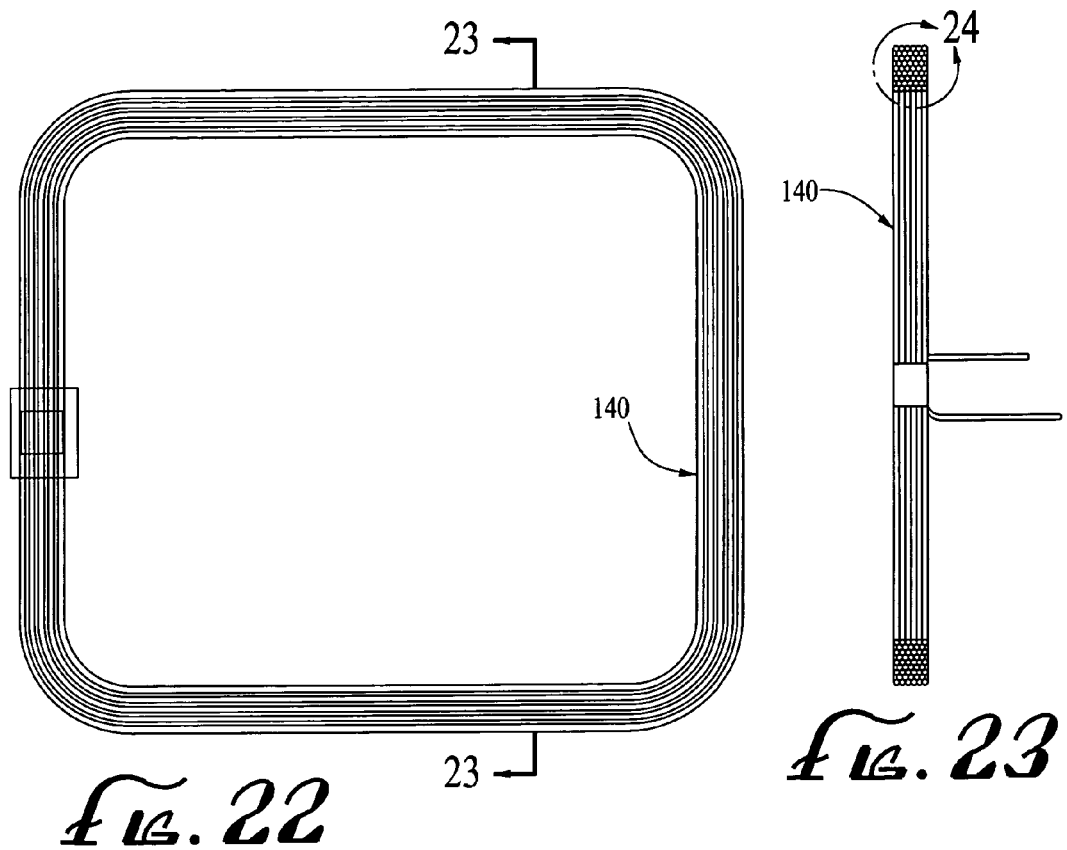
FIG. 22 is a front plan view of the coil unit of FIG. 21.
FIG. 23 is a cross-sectional view of the coil unit of FIG. 22 taken along line 23-23.
Figures 21, 24:
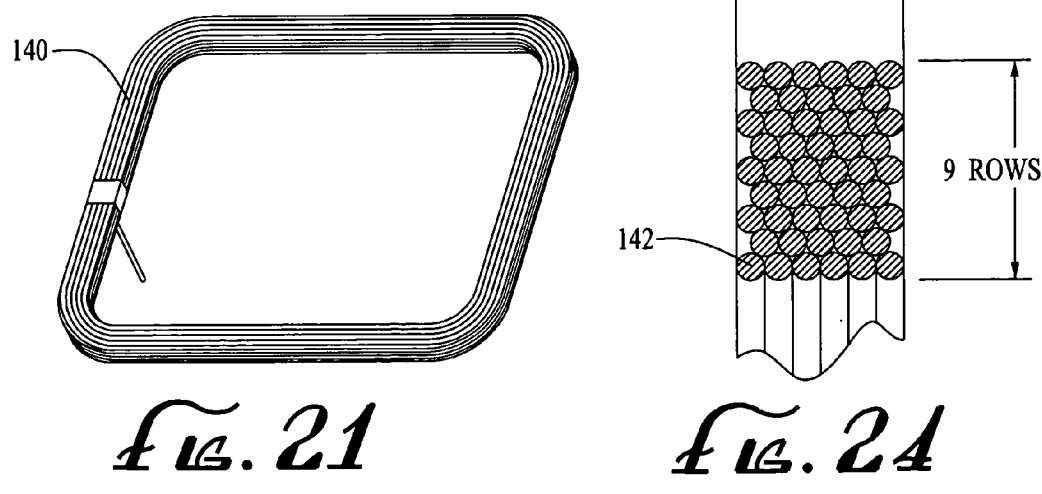
FIG. 21 is an isometric view of an alternate coil unit.
FIG. 24 is a detailed view of the windings of the coil unit of FIG. 23.

FIGS. 21-24 illustrate another embodiment for a coil unit 140 of a generally rectangular shape as viewed in FIGS. 21-22. As shown in the detailed cross-sections of FIGS. 23-24, the cross-sectional shape of the coil unit 140 is closer to square comprising nine rows by 5/6 layers for a total of approximately 50 turns 142.

Figure 25:
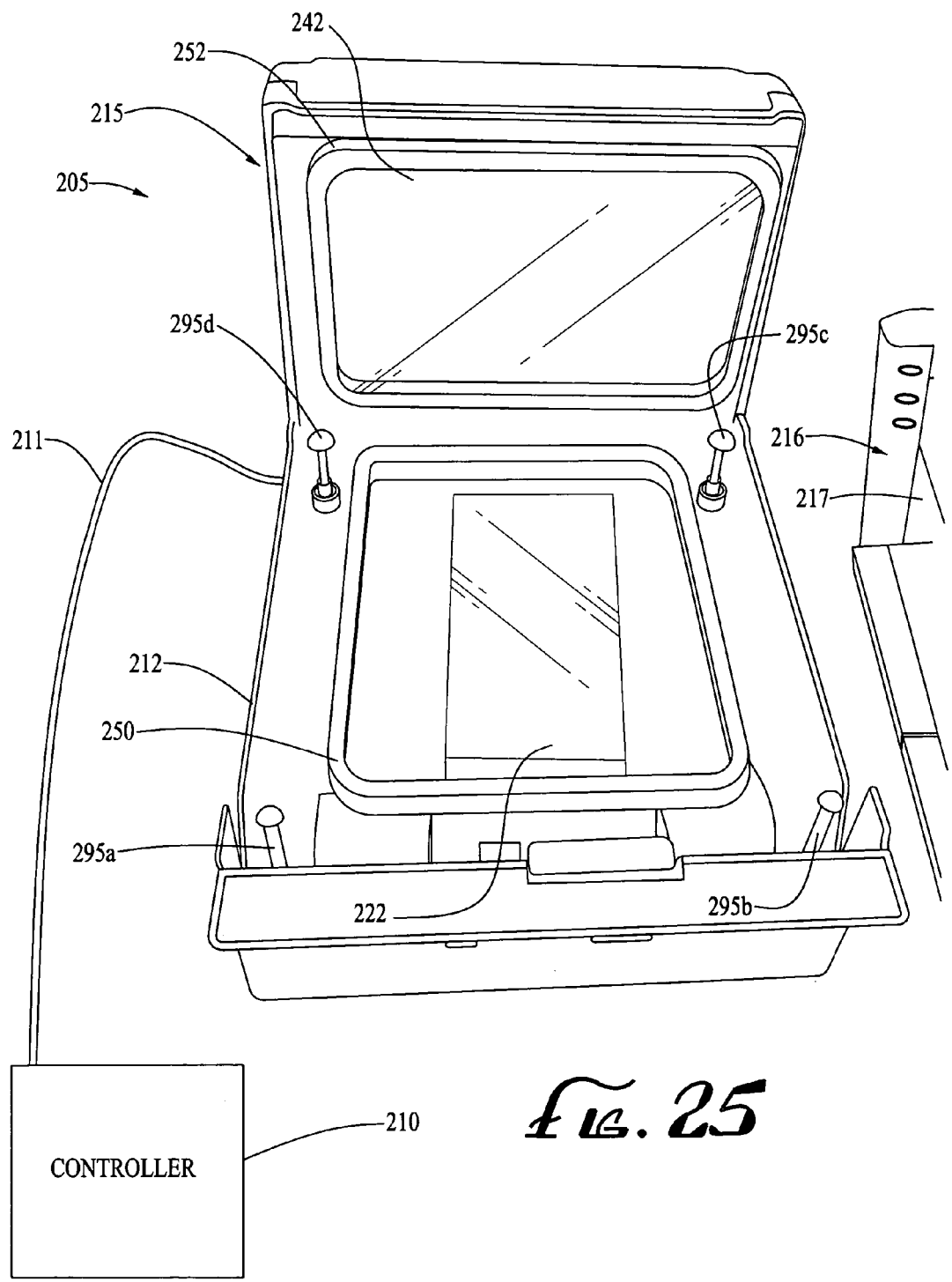
FIG. 25 is a top view of a combined data reader and EAS system according to an alternate embodiment, shown with the weigh platter removed.
Figure 26:
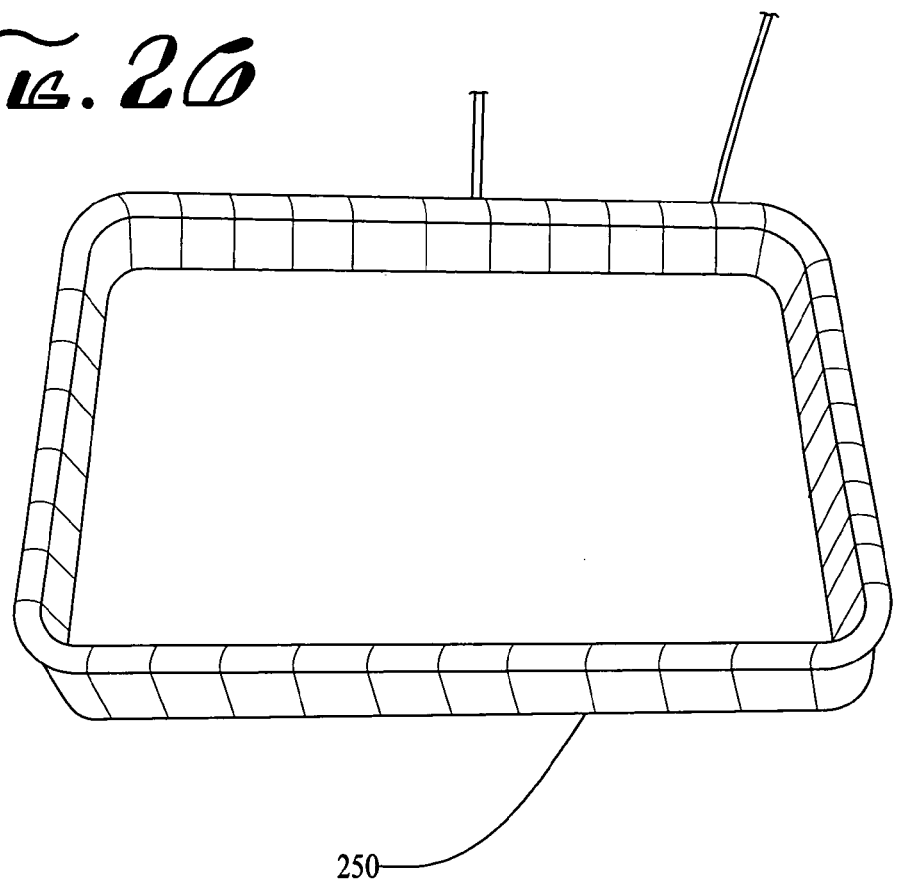
FIG. 26 is a perspective view of the horizontal coil unit from the combined data reader and EAS system of FIG. 25 removed from the system.
Figure 27:
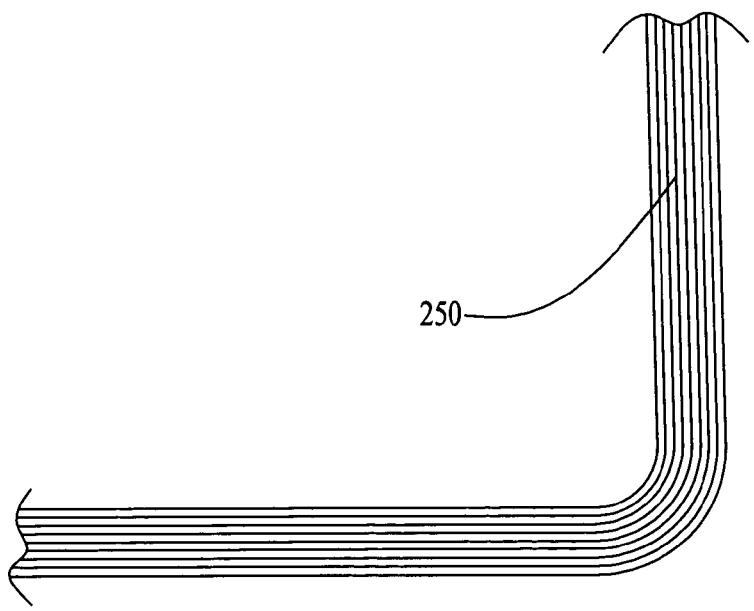
FIG. 27 is a detailed perspective view of a corner of the horizontal coil unit of FIG. 26 unwrapped with the internal windings exposed.

FIGS. 25-27 illustrate another combined EAS and data reading system 205. The system 205 includes a data reader 215, this embodiment shown as a dual plane L-shaped barcode scanner, and a controller 210 connected to the data reader 215 via cable 211. The data reader 215 is illustrated in the figure as a scanner scale shown with its two-plane weigh platter 216 removed, a portion of the platter 216 being visible in the right side of the figure. The weigh platter 216 is supported by posts 295a, 295b, 295c, 295d. The posts 295a-c extend to a bottom of the scanner housing 212 and are attached to a spider (not shown) which in turn is connected to and supported upon a load cell.

Disposed with the scanner 215 are a horizontal coil unit 250 surrounding the lower scan window 222 and an upper or vertical coil unit 252 disposed approximate the upper scan window 242.

FIG. 26 illustrates details of the lower horizontal coil 250 with the windings wrapped. FIG. 27 illustrates the actual coil windings before wrapping or coating as would typically be implemented during manufacture.

It is noted that the upper coil unit 252 is mounted external to the upper scan window 242 but would nonetheless be behind the vertical window 217 in the two-plane weigh platter 216 when the platter is disposed in position on the scanner 215.

Figure 28:
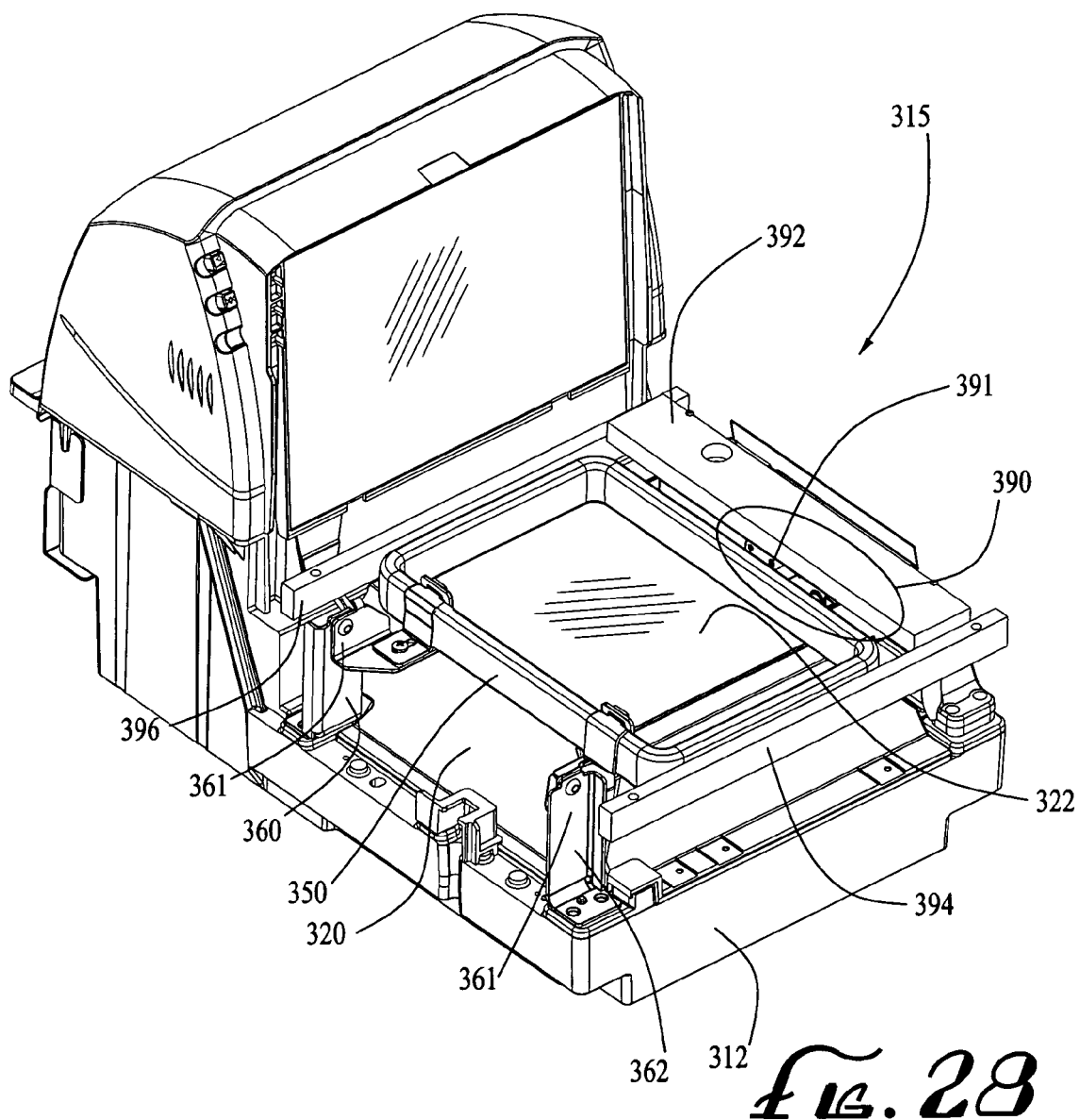
FIG. 28 is a top perspective view of a combined data reader and EAS system according to another alternate embodiment with the weigh platter removed.
Figure 29:
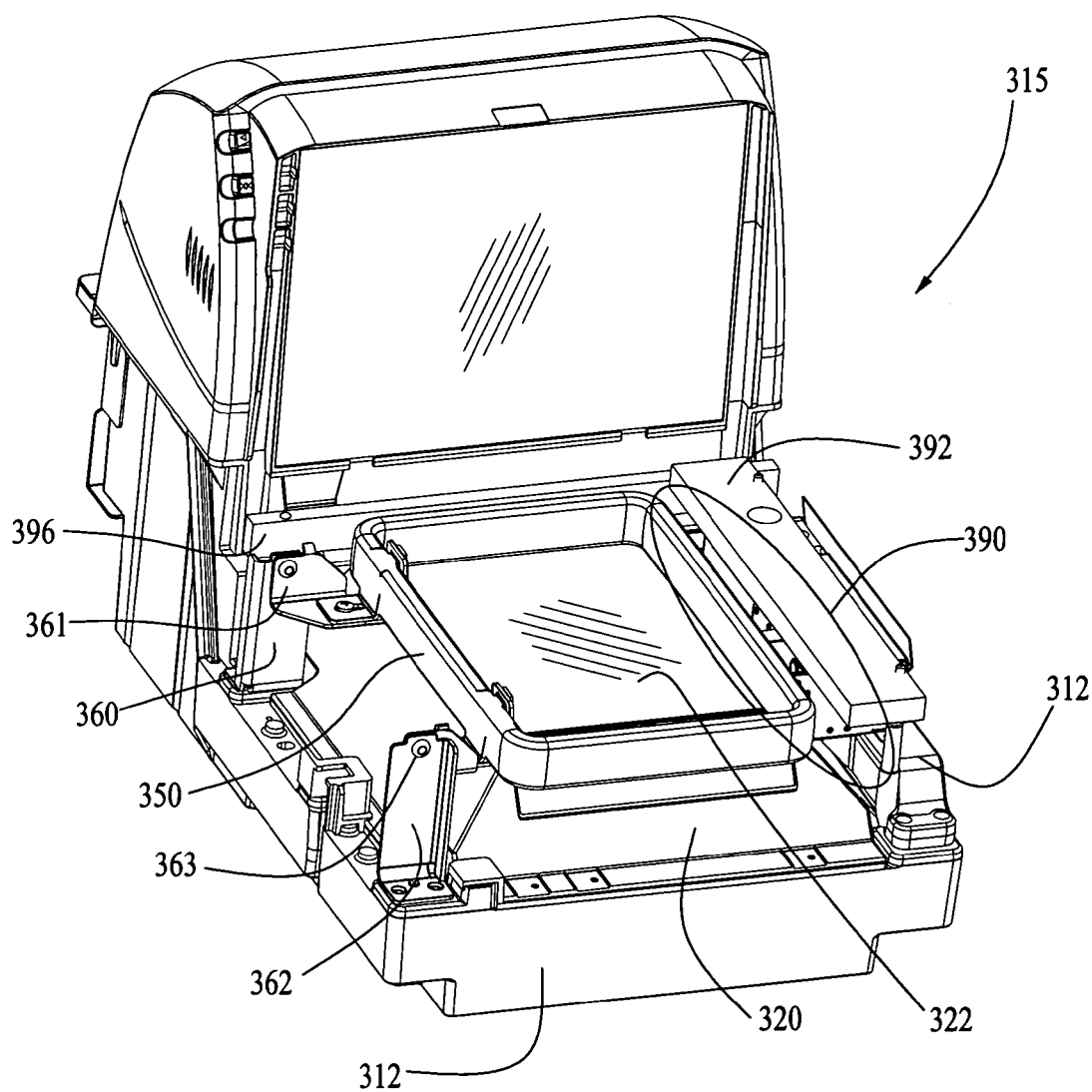
FIG. 29 is another perspective view of the combined data reader and EAS system of FIG. 28 with the horizontal coil unit in its operating position.
Figure 30:
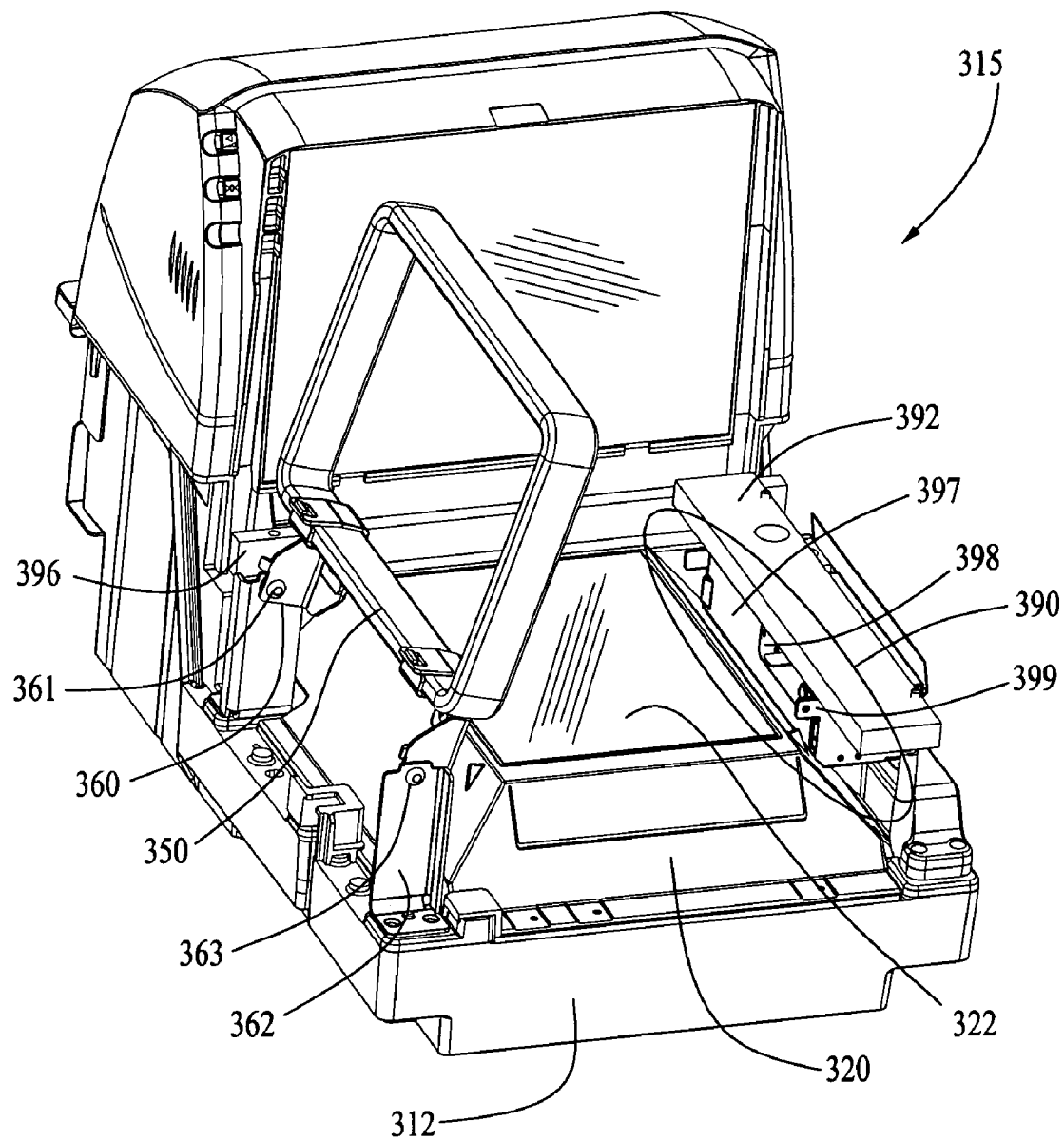
FIG. 30 is a perspective view of the system of FIGS. 28-29 with the horizontal coil unit shown pivoted to a second position.

FIGS. 28-30 illustrate an alternative embodiment for a combined EAS deactivation system and data reader 315 particularly showing an alternate mounting scheme for the horizontal coil unit 350. The data reader 315 is an L-shaped two-plane optical scanner such as the Magellan 9500 and illustrated with the two-plane weigh platter (known as the ALL-WEIGHS® platter) removed. The horizontal coil unit 350 is mounted either around or adjacent the horizontal window 322 of the lower scan section 320. The horizontal coil unit 350 is mounted by a pair of hinge mounting brackets 360, 362 which are in turn mounted to the chassis or outer housing 312. When in position, the coil unit 350 is nested within the U-shaped spider assembly 390 of the scale. The spider assembly 390 includes a central section 392 which is in turn mounted onto the load cell 391. Scale arms 394, 396 extend outward from the central section 392 to form a U-shape. In combination, the scale arms 396 and central section 392 provide support for the weigh platter.

The hinge mounting bracket 360 includes a hinge section 361 and the hinge mounting bracket 362 includes a hinge section 363 which permits pivoting of the horizontal coil unit 350 from the horizontal position as in FIGS. 28 and 29 upwardly and outwardly as illustrated in FIG. 30. Such a pivoting location allows for easy access for installation and/or repair of internal components. The pivoting coil unit 350 when in the pivoted condition also provides access to scale components such as the load cell cover door 397, the scale calibration button access door 398 and the security locking tab 399 as well as the surrounding areas which are preferably readily accessible when the scale is tested for calibration, locked, and sealed by an authorized weighs and measures inspector or serviced and recalibrated by a service technician. It also may be useful to pivot the horizontal deactivation coil 350 out of position to allow cleaning of components.

With the horizontal deactivation coil 350 mounted on the hinge brackets, the coil 350 may be temporarily and easily repositioned out of the way of the load cell area without the removal of mounting hardware or brackets which would otherwise require removing screws or other fasteners. The hinge brackets 360, 362 provide a simple, repeatable repositioning mechanism that allows the horizontal coil unit 350 to be placed in the desired operating position, yet readily moved to allow the desirable access. This hinged repositioning movement of the horizontal deactivation coil unit 350 and does not require a service technician, requiring no tools or removal of any hardware.

It is noted that the second scale arm 394 visible in FIG. 28 has been removed in FIGS. 29 and 30 to allow components to be more readily visible in these figures.

Figure 31:
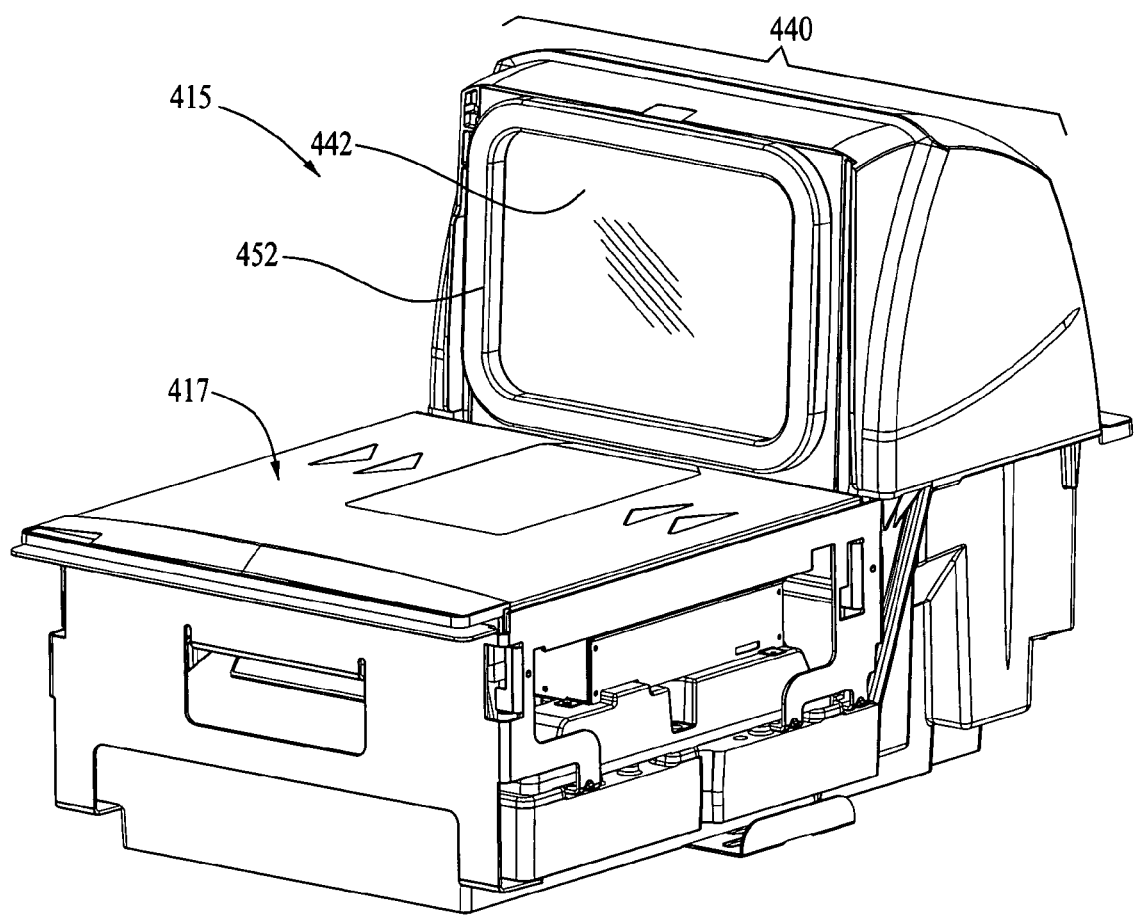
FIG. 31 is a perspective view of a combined data reader and EAS system according to another alternate embodiment with a vertical deactivation unit disposed in an external position.

FIG. 31 illustrates another combined EAS deactivation system and data reader 415 similar to previous embodiments but including an alternate mounting scheme for the vertical deactivation coil 452. The vertical deactivation coil 452 is mounted external to the vertical window 442, such as by brackets along the periphery thereof. The vertical coil unit 452 is mounted in position external to the upper bonnet 440. The coil unit may either be mounted directly to the bonnet or to suitable brackets. Alternately, if the system 415 is equipped with a two-plane cover 417 or if it is a scanner scale with a two-plane weigh platter, the coil unit 452 may be mounted to the cover via a suitable attachment mechanism as described below in another embodiment.

By mounting the deactivation coil 452 outside of the optical cavity, it places the coil as close to the scanning area as possible and thus increasing the performance of the EAS deactivation. External mounting also allows the geometry of the coil to be large enough to avoid optical interference of the scan pattern being passed out through the window and through the central cavity of the coil unit 452.

Figure 32:
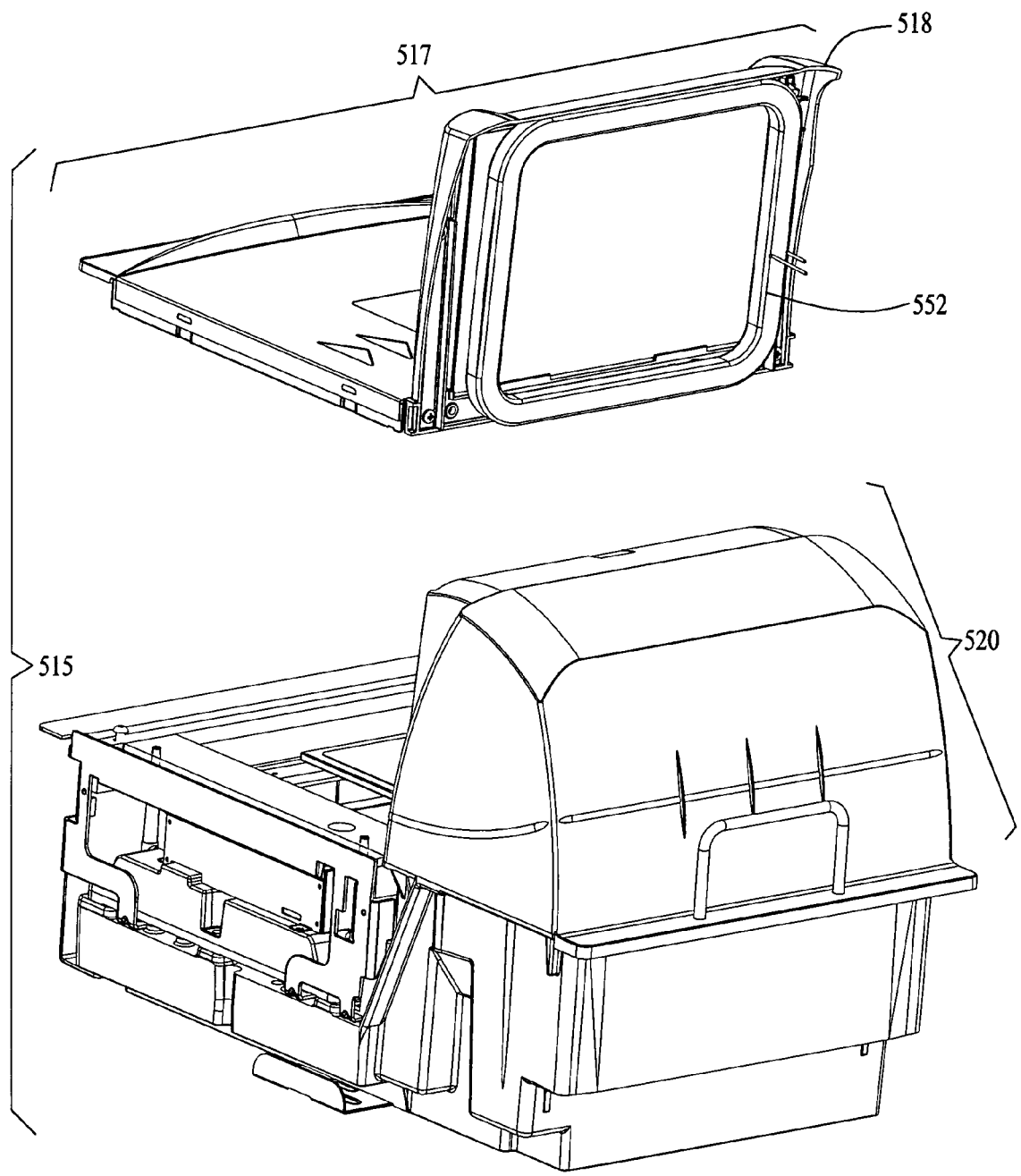
FIG. 32 is a perspective view of a combined data reader and EAS system according to another alternate embodiment with a vertical deactivation unit mounted to a rear surface of the removable weigh platter.

FIG. 32 illustrates another alternate combined EAS deactivation system and data reader 515. In this system, the data reader is equipped with a two-plane 200 cover 517 similar to the ALL-WEIGHS® platter available from PSC Inc. of Eugene, Oreg. The cover 517 may merely be a cover over a scanner or may alternately comprise the weigh platter for a scanner-scale. The cover section 517 is positionable onto the main section 520. The upper coil section 552 is mounted to a backside of the vertical section 518 of the two-plane cover 517 by a suitable mechanism. For example, the deactivation coil unit 552 may be mechanically fastened to the platter 517 via a bracket or bolts or it may be molded or otherwise formed into the platter structure itself.

By mounting the deactivation coil unit 552 into the vertical side of the removable platter 517 it becomes more fully integrated as part of the scanner. Having the coil unit 552 built into the platter places the coil in close proximity to the scanning area and thus increasing performance of EAS deactivation. The mounting method may insure more safety from electrical shock by enclosing the high voltage coil in the platter. By mounting the vertical deactivation coil unit 552 to the platter, more accurate and repeatable positioning of the coil after the platter has been removed and then returned to a normal operating position can be achieved. Mounting to the platter also simplifies the mounting mechanisms as compared to other mounting schemes. Where the platter 517 is merely a cover in a non-scale scanner, the platter is free from restriction of adding weigh and electrical wires to the platter assembly as would be encountered in a scanner scale. Thus, this mounting scheme may not be preferred for the scanner scale configuration, but would nonetheless be a feasible option.

Figure 33:
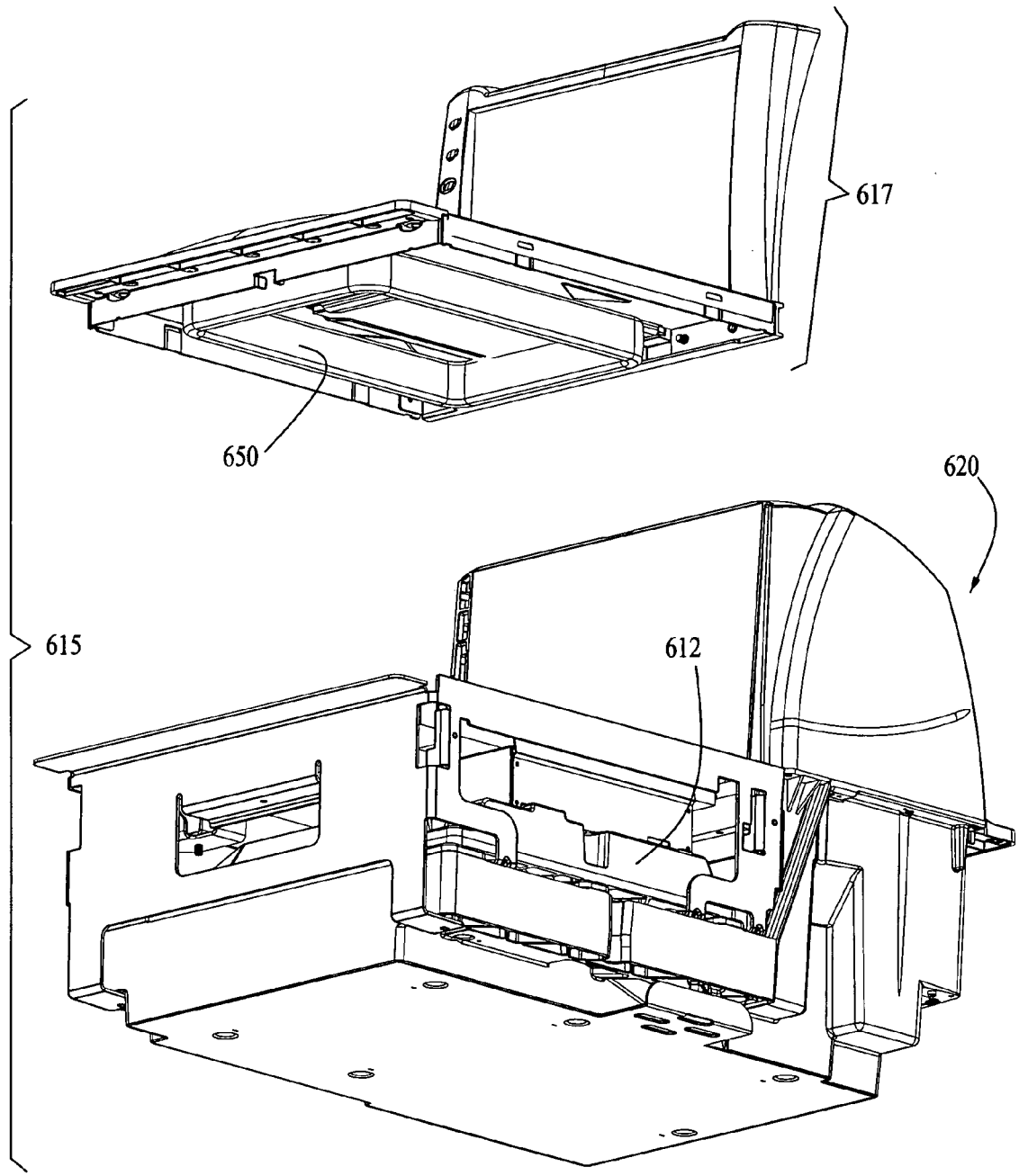
FIG. 33 is a perspective view of a combined data reader and EAS system according to another alternate embodiment with a horizontal deactivation unit mounted to an underside of the removable weigh platter.

FIG. 33 illustrates another combination EAS deactivation system and data reader 615. The system includes a two-plane scanner 620 upon which is disposed a two-plane cover or weigh platter 617. The horizontal coil unit 650 is mounted to an underside of the horizontal section of the two-plane platter 617. Having the coil built into the removable platter places the coil in close proximity to the scanning area thus increasing EAS deactivation performance. This mounting is similar to the vertical coil mount of the previous embodiment and may also insure for more safety from electrical shock by enclosing the high voltage coil in the platter. The location also ensures accurate and repeatable repositioning of the horizontal deactivation coil unit 350 after it has been removed and then returned to normal operating position. Mounting the horizontal deactivation coil unit 650 to the platter 617 provides for a simplified assembly. When the coil unit 650 is mounted to a platter in a non-scale scanner, the platter 617 would be free of the restriction of adding weigh and electrical wires to the platter assembly. Further mounting the coil to the platter would take advantage of the any free space left by the absence of the scale in the non-scale scanner version.

Alternately the embodiments of the horizontal coil unit 650 mounted to the underside of the platter 617 may be combined with the vertical coil unit 552 being mounted to the back of the vertical section of the platter 518 of the previous embodiment. These mounting positions also provide for ready access to the coil units for service and repair.

The systems disclosed may alternately comprise not only EAS deactivation units, but also activation units or combined activation/deactivation units usable with activatable EAS tags. In addition, the EAS tag deactivators/activators described may include deactivation or activation of various types of EAS tags such as magnetoacoustic, magnetomechanical, magnetostrictive, RF (e.g. RFID), microwave, and harmonic type tags. Moreover, in each of the above embodiments, the deactivation units may comprise coil units with or without internal (magnetically active) core. For example, deactivation coils without internal core are described in U.S. Pat. No. 5,917,412 incorporated by reference. The deactivation units of the above embodiments may be controlled and operated by any suitable scheme as known by one skilled in the art, including but not limited to those schemes disclosed in U.S. Pat. Nos. 5,917,412; 6,281,796; 6,169,483; and 5,059,951 hereby incorporated by reference in their entirety.

In the various embodiments described above, the data reader unit has been generally described as a two window L-shaped bar code scanner, but other types of data readers may be combined with the EAS deactivation/activation system. The data reader may be for example a laser bar code scanner, an imaging reader, or other type of reader for reading optical codes, reading tags, or otherwise identifying items being passed through a scan/read zone.

Thus the present invention has been set forth in the form of its preferred embodiments. It is nevertheless intended that modifications to the disclosed scanning systems may be made by those skilled in the art without altering the essential inventive concepts set forth herein.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for use at point of sale, comprising
   an optical data reader having a plurality of optical scanning elements for reading optical tags being passed through a scan volume;
   a deactivator for deactivating electronic article surveillance (EAS) tags, said deactivator having at least one magnetic deactivation coil unit arranged to avoid interference with operation of the optical data reader, wherein the deactivation coil unit comprises a plurality of windings disposed around a central opening without a solid core, the deactivation coil unit positioned to permit the data reader to form a read path through the central opening into the scan volume, wherein the windings of the deactivation coil unit are arranged with a cross-sectional geometry that avoids blocking the reading path of the data reader through the central opening.

2. The apparatus of claim 1, wherein the deactivator comprises a plurality of magnetic deactivation coil units, the apparatus further comprising a controller for controlling operation of said data reader and/or said deactivator wherein said controller is programmed to detect which of said magnetic deactivation coil units is best suited for deactivation and only energizes that coil unit.

3. The apparatus of claim 1 wherein the optical data reader comprises a lower section having a substantially horizontal window and an upper section having a substantially vertical window, the deactivator including at least first and second magnetic deactivation coil units, the first magnetic deactivation coil unit comprising a plurality of windings disposed around a central opening without a solid core, the first deactivation coil unit positioned proximate the horizontal window forming a first read path through the central opening and through the horizontal window to the scan volume, the second magnetic deactivation coil unit comprising a plurality of windings disposed around a central opening without a solid core, the second deactivation coil unit positioned proximate the vertical window forming a second read path through the central opening and through the vertical window to the scan volume.

4. An apparatus according to claim 3 further comprising a controller for controlling operation of said data reader and/or said deactivator wherein said controller is programmed to detect which of said magnetic deactivation coil units is best suited for deactivation and only energizes that coil unit for deactivating an EAS tag.

5. An apparatus according to claim 3 further comprising a controller for controlling operation of said deactivator, wherein the deactivation coil units are operable for both detection and deactivation, wherein said controller is programmed to first activate that coil unit that first detects presence of an EAS tag.

6. An apparatus according to claim 1 wherein the deactivation unit comprises on the order of 50 windings.

7. An apparatus for use at point of sale, comprising
a housing;
an optical data reader disposed in the housing and having at least a first window through which the optical data reader reads optical tags being passed through a read volume;
a deactivator for deactivating electronic article surveillance (EAS) tags, said deactivator having at least a first magnetic deactivation coil unit disposed in the housing proximate the first window, wherein the first deactivation coil unit comprises a plurality of windings disposed around a central opening without a solid core, the first deactivation coil unit positioned to permit the data reader to form a read path through the central opening and into the read volume.

8. An apparatus according to claim 7 wherein the windings of the first deactivation coil unit are arranged with a cross-sectional geometry that avoids blocking the reading path of the data reader through the central opening.

9. An apparatus according to claim 7 wherein the windings of the first deactivation coil unit are arranged having a cross-sectional geometry with a beveled profile along the central opening.

10. An apparatus according to claim 7 wherein the windings of the first deactivation coil unit are arranged to form a beveled profile along an inside surface thereof adjacent the central opening such that a diameter of the central opening proximate the optical data reader is smaller than a diameter of the central opening distal the optical data reader.

11. An apparatus according to claim 7 wherein the magnetic coil unit is configured in a generally rectangular configuration arranged around the central opening.

12. An apparatus according to claim 7 wherein the windings are arranged in a non-rectangular cross-sectional profile.

13. An apparatus according to claim 7 wherein the windings are arranged in a cross-sectional profile selected from the group consisting of: non-rectangular, triangular, trapezoidal.

14. An apparatus according to claim 7 further comprising a hinge mounting bracket for supporting the first magnetic deactivation coil unit.

15. An apparatus according to claim 14 wherein the first magnetic deactivation unit is pivotable via the hinge mounting bracket between a first position proximate the first window and a second position away from the window.

16. An apparatus according to claim 1 wherein the data reader comprises an L-shaped two-plane optical scanner.

17. An apparatus according to claim 7 wherein the optical data reader comprises an L-shaped two-plane optical scanner.

* * * * *